United States Patent
Li et al.

(10) Patent No.: US 9,124,610 B2
(45) Date of Patent: Sep. 1, 2015

(54) METHOD AND SYSTEM FOR MAINTAINING CONTACT INFORMATION

(71) Applicant: Huawei Technologies Co., Ltd., Shenzhen, Guangdong (CN)

(72) Inventors: Zijun Li, Shenzhen (CN); Guangbin Fan, Shenzhen (CN); Ning Piao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 13/656,140

(22) Filed: Oct. 19, 2012

(65) Prior Publication Data

US 2013/0138738 A1    May 30, 2013

(30) Foreign Application Priority Data

Oct. 20, 2011    (CN) .......................... 2011 1 0320961

(51) Int. Cl.
*G06F 15/16* (2006.01)
*H04L 29/08* (2006.01)
*H04L 29/06* (2006.01)
*H04L 29/12* (2006.01)

(52) U.S. Cl.
CPC ........ *H04L 67/1095* (2013.01); *H04L 61/1594* (2013.01); *H04L 65/1073* (2013.01); *H04L 65/403* (2013.01)

(58) Field of Classification Search
CPC .................................................. H04L 61/1594
USPC ......................................... 709/203, 204, 206
See application file for complete search history.

(56) References Cited

U.S. PATENT DOCUMENTS

| | | | |
|---|---|---|---|
| 7,461,071 B2* | 12/2008 | Fitzpatrick et al. .................... 1/1 |
| 2006/0224597 A1* | 10/2006 | Fitzpatrick et al. ............. 707/10 |
| 2009/0125523 A1* | 5/2009 | Fitzpatrick et al. ............... 707/9 |
| 2009/0298489 A1* | 12/2009 | Chitturi et al. ................ 455/418 |
| 2010/0077027 A1* | 3/2010 | Chitturi et al. ................ 709/203 |
| 2012/0077529 A1* | 3/2012 | Kim et al. ..................... 455/466 |
| 2012/0140265 A1* | 6/2012 | Laursen et al. .............. 358/1.15 |

FOREIGN PATENT DOCUMENTS

CN            102105877 A       6/2011

* cited by examiner

*Primary Examiner* — Jude Jean Gilles
(74) *Attorney, Agent, or Firm* — Leydig, Voit & Mayer, Ltd.

(57) ABSTRACT

The present disclosure relates to communication technologies, and particularly, to a method, apparatus and system for maintaining contact information. The embodiment of the present invention provides a method for maintaining contact information, including: acquiring address book information of a user and authorization settings of the address book information of the user and saving the acquired in an address book server, receiving a subscription request from a subscriber device, and establishing, according to confirmation information from the subscribed-for user regarding the subscription request from the subscriber device, a subscription relation list for a subscribed-for user and subscriber device and updating, by the address book server, address book information of the subscriber device according to a subscription relation and authorization in the subscription relation list when the subscribed-for user modifies the address book information of the subscribed-for user in the address book server.

21 Claims, 8 Drawing Sheets

| | User_ID | Reflash_To | Reflash_From |
|---|---|---|---|
| User_Reflash=1 | ID=165478 | Sub_Reflash=0 | Sub_Reflash=0 |
| | ID=metalman | Sub_Reflash=1 | Sub_Reflash=1 |
| | ID=User Terminal C | Sub_Reflash=1 | Sub_Reflash=1 |
| | ID=Li Shuang | Sub_Reflash=1 | Sub_Reflash=1 |
| | ID=845632 | Sub_Reflash=0 | Sub_Reflash=0 |
| | ID=124523 | Sub_Reflash=1 | Sub_Reflash=1 |
| | ID=alion | Sub_Reflash=0 | Sub_Reflash=0 |
| | ID=2598345 | Sub_Reflash=0 | Sub_Reflash=0 | user terminal A

| | User_ID | Reflash_To | Reflash_From |
|---|---|---|---|
| User_Reflash=1 | ID=165478 | Sub_Reflash=0 | Sub_Reflash=0 |
| | ID=adfa | Sub_Reflash=1 | Sub_Reflash=1 |
| | ID=User Terminal A | Sub_Reflash=0 | Sub_Reflash=1 |
| | ID=2334 | Sub_Reflash=1 | Sub_Reflash=1 |
| | ID=12345 | Sub_Reflash=0 | Sub_Reflash=0 |
| | ID=lisa | Sub_Reflash=1 | Sub_Reflash=1 |
| | ID=alion | Sub_Reflash=0 | Sub_Reflash=0 |
| | ID=Xiao Ming | Sub_Reflash=0 | Sub_Reflash=0 | user terminal C

Figure 5

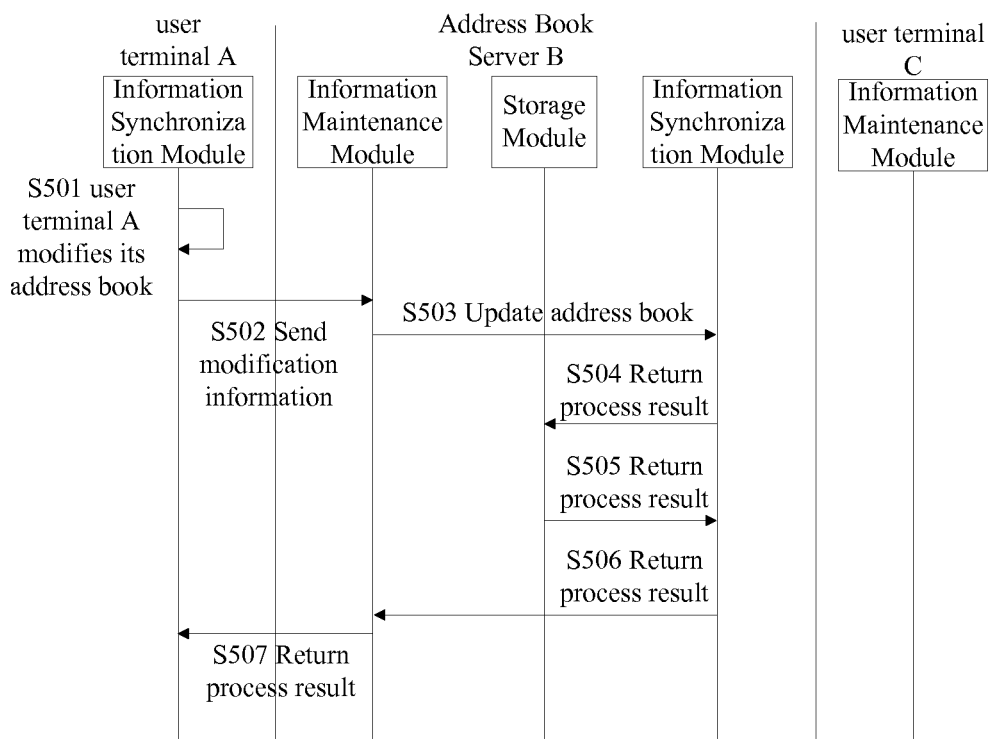

Figure 6

| | User_ID | Subs_To | Subs_From |
|---|---|---|---|
| User_Subs=1 | ID=165478 | Sub_Subs=0 | Sub_Subs=0 |
| | ID=metalman | Sub_Subs=1 | Sub_Subs=1 |
| | ID=User Terminal C | Sub_Subs=1 | Sub_Subs=1 |
| | ID=Li Shuang | Sub_Subs=1 | Sub_Subs=1 |
| | ID=845632 | Sub_Subs=0 | Sub_Subs=0 |
| | ID=124523 | Sub_Subs=1 | Sub_Subs=1 |
| | ID=alion | Sub_Subs=0 | Sub_Subs=0 |
| | ID=2598345 | Sub_Subs=0 | Sub_Subs=0 |

User Terminal A

| | User_ID | Subs_To | Subs_From |
|---|---|---|---|
| User_Subs=1 | ID=165478 | Sub_Subs=0 | Sub_Subs=0 |
| | ID=adfa | Sub_Subs=1 | Sub_Subs=1 |
| | ID=user terminal A | Sub_Subs=0 | Sub_Subs=1 |
| | ID=2334 | Sub_Subs=1 | Sub_Subs=1 |
| | ID=12345 | Sub_Subs=0 | Sub_Subs=0 |
| | ID=lisa | Sub_Subs=1 | Sub_Subs=1 |
| | ID=alion | Sub_Subs=0 | Sub_Subs=0 |
| | ID=Xiao Ming | Sub_Subs=0 | Sub_Subs=0 |

User terminal C

Figure 9

| Contact | High Frequent Contact |
|---|---|
| Li Can | |
| Li Gang | |
| Li Ming | |
| ⋮ | |

| Contact | High Frequent Contact |
|---|---|
| Xiao Qiang | |
| Xu Ming | |
| Chen Ming | |
| ⋮ | |

Figure 10

METHOD AND SYSTEM FOR MAINTAINING CONTACT INFORMATION

CROSS-REFERENCE TO RELATED APPLICATIONS

This application claims priority to Chinese Patent Application No. 201110320961.7, filed on Oct. 20, 2011, which is hereby incorporated by reference in its entirety.

FIELD OF TECHNOLOGY

The present invention relates to communication technologies, and particularly, to a method, apparatus and system for maintaining contact information.

BACKGROUND

In the current Internet and communication applications, the address book information (also called contact information) of a user may be distributed in several places, e.g., information on the user or his/her friends may be found in mobile phones, Emails, Taobao, etc. Since the expansion of information, the address book information will include not only traditional information like name, age, address, telephone number, but also email address, micro-blog address, etc. All or part of the information is keyed in manually by the user and the user needs to key in the information all over again every time the user registers at a new website; and when the information of a friend changes, the user also needs to make amendments manually.

Along with the growth of Internet applications, more and more applications are coming up, such as QQ, micro-blogs, Internet communities, ecommerce applications, etc. Every application has its own address book and the more and more information is included in the address book, and thus maintaining the information and keeping the information consistent with the actual situation has become a heavy burden.

SUMMARY

The embodiments of the present invention provide a method, apparatus and system for maintaining contact information, and provide a mechanism for saving address book information in a centralized way on Internet servers, so that a user needs to maintain just one set of address book information with authorization level and has the address book information in other subscriber terminals of the user updated accordingly.

Embodiments of the present invention provide a method for maintaining contact information, comprising:

acquiring address book information of a user and authorization setting of the address book information of the user, saving the acquired in an address book server;

receiving a subscription request from a subscriber device, and establishing, according to confirmation information from the subscribed-for user regarding the subscription request from the subscriber device, a subscription relation list for a subscribed-for user and the subscriber device; and updating, by the address book server, the address book information of the subscriber device according to a subscription relation and authorization settings in the subscription relation list when the subscribed-for user modifies address book information of the subscribed-for user in the address book server.

Embodiments of the present invention provide a method for maintaining contact information, comprising:

sending, by an address book application in a user terminal, address book information and authorization of the address book information to an address book server;

acquiring an address book subscription request from a subscriber device, returning confirmation information from a subscribed-for user to the address book server regarding the subscription request from the subscriber device;

modifying, by the address book application in the user terminal, the address book information of the user terminal in the address book server, wherein the modifying includes modifying contents of address book information items or authorization on each of the address book information items; and receiving, by the subscriber device, the address book update information of the subscribed-for user sent from the address book server and updating address book information of the subscribed-for user in the subscriber device.

Embodiments of the present invention provide an address book server apparatus, comprising:

an information maintenance module, used for acquiring address book information of a user and authorization settings of the address book information and acquiring the modification made by the user on the address book information of the user stored in the address book server;

a storage, used for storing a relation list for the user and subscriber devices, address book information of the user and the authorization settings regarding the subscriber devices; and an information synchronization module, used for receiving the address book information updated by the user from the information maintenance module and updating the address book information of the subscriber devices according to the subscription relations and authorization settings in the relation list.

Embodiments of the present invention provide an address book application apparatus, comprising:

an information maintenance module, used for acquiring an address book subscription request of a subscriber and returning confirmation information from the subscribed-for user regarding the subscription request of the subscriber device to a address book server, and further used for acquiring address book update information of the subscribed-for user and updating address book information corresponding to the subscribed-for user in a storage;

an information synchronization module, used for sending address book information and authorization settings of the address book information to an address book server, and further used for modifying address book information of the address book application apparatus in the address book server; and a storage, used for storing the address book information of subscribed-for user.

Embodiments of the present invention provide a system for maintaining contact information, comprising:

an address book server, used for receiving address book registration information of a user, which carries the authorization settings of the address book information, saving the user address book registration information in the address book server, receiving a subscription request from a subscriber device, establishing, according to confirmation information from the subscribed-for user regarding the subscription request from the subscriber device, a subscription relation list for a subscribed-for user and the subscriber device, and updating, by the address book server, the address book information in the subscriber device according to the subscription relation and authorization settings in the subscription relation list when the subscribed-for user modifies the address book information of the subscribed-for user stored in the address book server;

an user terminal, used for registering address book information of the user terminal at the address book server, modifies information of the user terminal in the address book server according to the operation of the user terminal, as the user terminal has a storage, receiving updated address book information from the address book server after the subscribed-for user modified the address book information of its own, and modifying the address book information of the subscription user stored in the user terminal.

The embodiments of the present invention allow address book information of a user to be acquired according to authorization set by the user, and when the user modifies the address book information of its own, sends updated information to the subscriber terminal of the user to achieve automatic update.

BRIEF DESCRIPTION OF THE DRAWINGS

FIG. 5 is a schematic diagram illustrating the structure of a synchronization update list in accordance with the present invention;

FIG. 6 is a flow chart illustrating the signaling of a method for updating address book information in accordance with the present invention;

FIG. 9 is a schematic diagram illustrating the structure of a synchronization subscription list in accordance with the present invention;

FIG. 10 is a schematic illustrating the appearance of a frequent contact list in accordance with the present invention.

DETAILED DESCRIPTION

Figure 1:
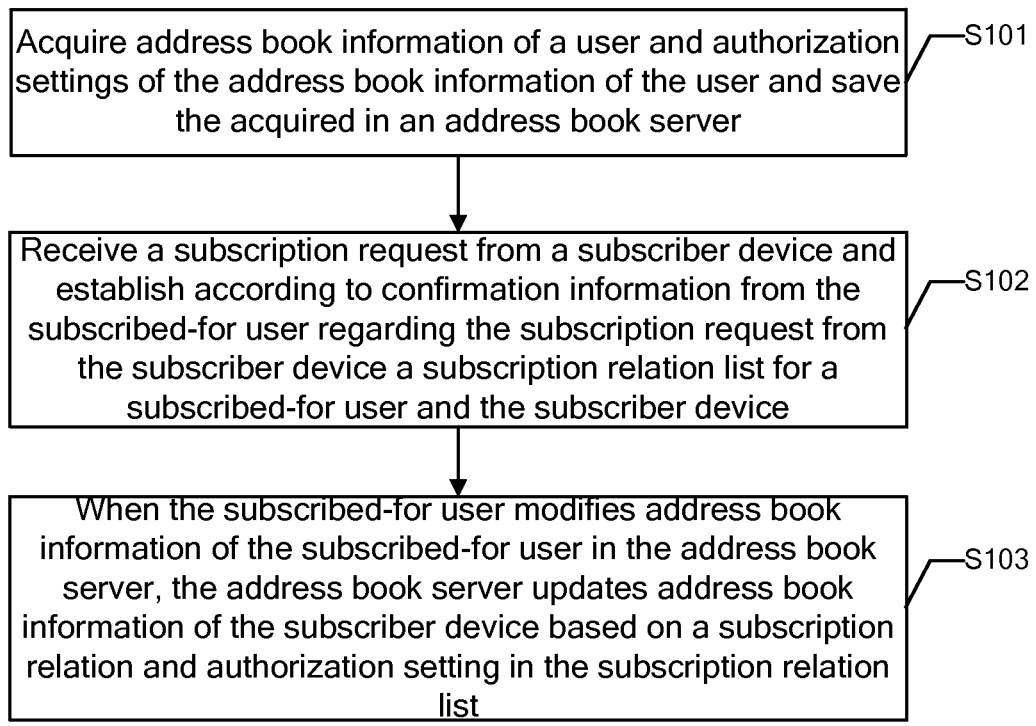
FIG. 1 is a flow chart illustrating a method for maintaining contact information in accordance with the present invention.

According to an embodiment of the present invention, as shown in FIG. 1, a method for maintaining contact information comprises:

S101: acquire address book information of a user and authorization settings of the address book information of the user and save the acquired in an address book server.

The address book server receives the registered address book information of the user, including address book information with public authorization, such as name, gender, contact method, and also including address book information with protected authorization, such as cell phone number, address, age, etc. Specifically, authorization settings include: public, protected and private, the information with public authorization is open to all users and shows search results to subscribers for reference, the information with protected authorization is open only to subscribers designated by the subscribed-for user, and information with private authorization is open only to the user himself or herself. When a third party application needs to acquire the information set as private or protected information by the user, the third party application may send an authorization request to the user through the address book server. Furthermore, the address book server saves the registered information in accordance with the authorization settings. According to the demands of the user, e.g., if the user is often on a business trip, multiple sets of address book information may be registered in the address book server. The user as a subscribed-for user may accept the subscription for the above address book information from other users.

S102: receive a subscription request from the subscriber device, and establish, according to confirmation information from the subscribed-for user regarding the subscription request from the subscriber device, a subscription relation list for the subscribed-for user and the subscriber device.

The address book server receives the subscription request from the subscriber device, and the subscription request carries a user ID (User_ID), corresponding to address book information to be subscripted for. If address book information corresponding to the User_ID in the subscription request is found on the server, the address book server sends the address book information which meets requirements for authorization to the subscriber device according to the address book information with authorization settings saved in S101, and completes the subscription in accordance with the confirmation information from the subscribed-for user. If the subscribed-for user returns allowance, the address book server establishes a relation list for the subscriber device, including unidirectional and bi-directional relation lists. The confirmation information regarding the subscription request may include: allowing the subscription by the counterpart and subscribing for a counterpart, allowing the subscription by the counterpart, or forbidding the subscription by the counterpart; the allowing may include: allowing the subscription by the counterpart and subscribing for the counterpart and allowing the subscription by the counterpart. When the subscriber device has its own storage, the subscriber device may further store the address book information of the subscribed-for user in its own storage; when the subscriber device does not have its own storage, the storage of the address book server may store address books of the subscriber device and the subscribed-for user. When the user selects a subscribed-for user in the user's own subscription relation list and recommends the selected subscribed-for user to another subscribed-for user in the subscription relation list, the address book server receives a recommendation operation request and sends a subscription request from the another subscribed-for user to the selected subscribed-for user.

S103: when the subscribed-for user modifies the address book information of the subscribed-for user stored in the address book server, the address book server updates the address book information in the subscriber device according to the subscription relation and authorization in the subscription relation list.

When the user logs in the address book server and modifies the address book information of the user in the address book server, the address book server searches for a subscriber terminal of the user according to the subscription relations in the subscription relation list and finds out whether a user terminal has the functionality of storing the address book. If the user terminal has the functionality of storing the address book, the address book server sends the updated address book information that includes the modified items to the subscriber device according to the authorization set when the subscribed-for user registered at the address book sever; if a user terminal does not have the functionality of storing the address book and stores the subscribed address book information in the address book server, the address book server modifies the address book information which is subscribed for by each user terminal stored in the address book server directly according to the subscription relation list; if a user terminal does not have the functionality of storing the address book and reads the subscribed address book information directly from the address book server, the address book server saves the modification made by the user terminal, and when other subscriber devices obtain the address book information of the user terminal through the address book server, the address book server reads the modified information according to the authorization of the subscriber device and presents the information to the subscriber device.

When the user has multiple sets of address book information and chooses a set to replace the address book information that is currently in use, the address book server will sends, according to the currently activated address book information, the updated activated address book information to subscriber devices; furthermore, when the user registers multiple sets of address book information, the address book server may switch address book information sets according to address information of a terminal where the user logs in and an address item in the address book information registered by the user and updates the address books of the subscribers of the user according to the relation list of the user. Specifically, the updating includes: the address book server will find a match of address information in the address book information registered by the user with the identifier of a terminal where the user logs in, and sending a confirmation request to the user once a match is found, choosing whether to update the information in the address book server according to a confirmation result of the user. The address book server may acquire the current address information of the user terminal according to the IP address logged by the user terminal, the home location of a cell phone or the home location of wifi.

Figure 2:
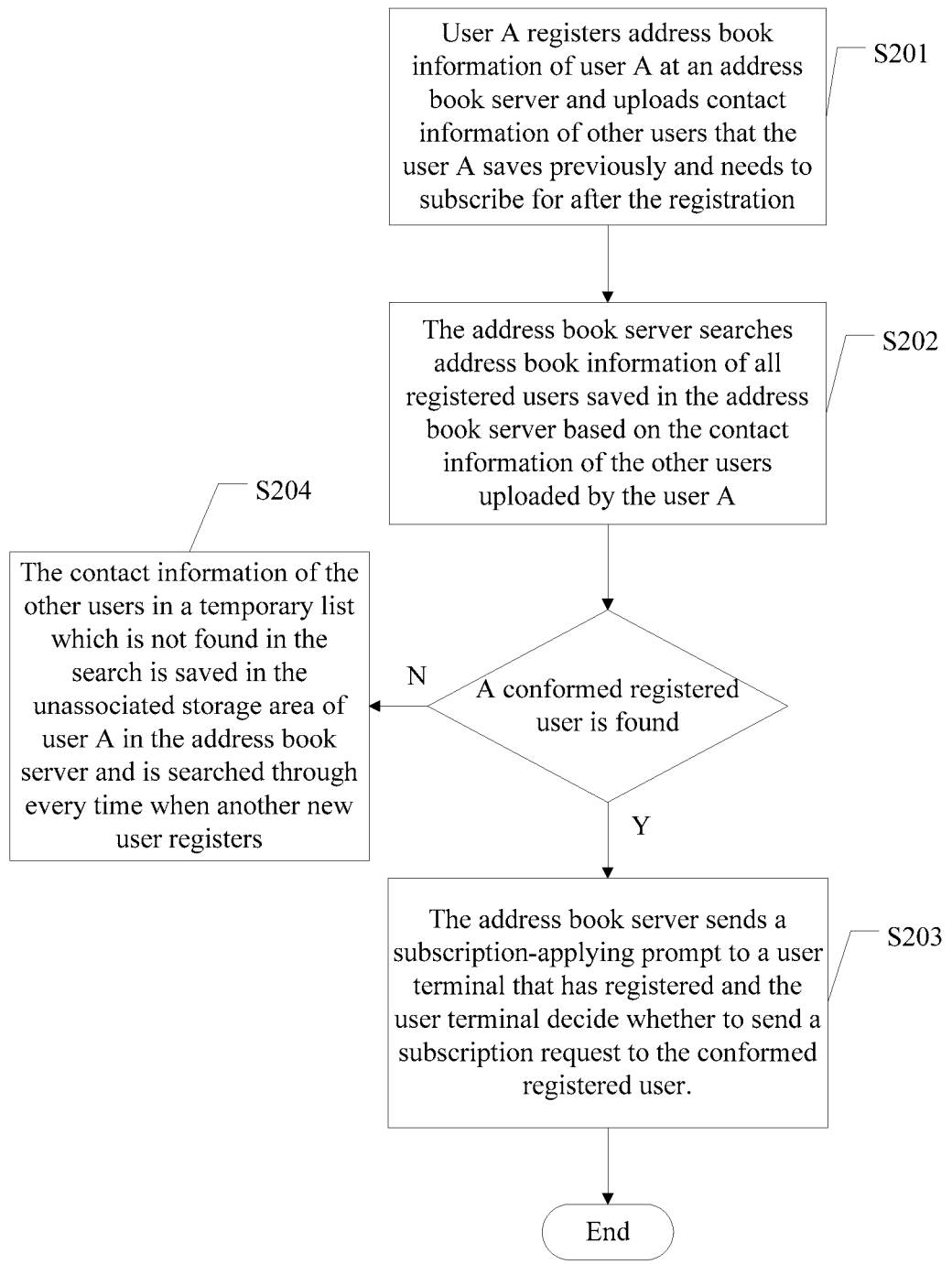
FIG. 2 is a flow chart illustrating a method for a user to log in an address book server for the first time in accordance with the present invention.

In an embodiment of the present invention used for the user to register address book information, specific address book information may be registered when the user registers or after a registration is completed. This embodiment is based on the case of completing the registration of address book while the user registers and the flow chart of signaling is shown in FIG. 2. When user A carries the saved contact information of other users and registers at the address book server, and the contact information of other users carried may include the contact information in a telephone book of the cell phone terminal of the user A, or address book information from other address book servers used by the user A previously. In this embodiment, the contact information of other users includes address book information from other address book servers, and the embodiment includes the following contents.

Step 201: the user A registers the address book information of the user A at the address book server and after registration, uploads the contact information of other users that the user A saves previously and needs to subscribe for.

The contact information includes names, telephone numbers and contact addresses. When the user A logs in the address book server through an address book application for the first time, the user A needs to complete registration once, and the address book application scans the contact information of other users saved in the user terminal and uploads the contact information of other users, which is obtained through the scan to the address book server after registration, and the address book server generates a temporary list for search; if no contact information of other users is obtained through the scan, the process ends after registration. When the user A has it's own storage and needs to transfer from the current address book server to another address book server, the user A needs to complete registration once and uploads the contact information of other users carried by the user A to the another address book server, the address book server will generate a temporary list for search. The contact information of other users includes the address book information of existing subscribers of the user A.

S202: the address book server searches the address book information of all registered users stored in the address book server based on the contact information of other users uploaded by the user A.

Specifically, the address book server searches the address book information of all users registered at the address book server according to the contact information contained in the temporary list generated in S201 for search, the contact information may include names, telephone numbers, etc.

S203: the address book server sends a subscription-applying prompt to the user terminal that currently registers, and the user terminal chooses whether to send subscription requests to the conformed registered users.

The address book server searches the stored address book information of the registered users, and when contact information or multiple items information is found identical or conform to the contact information in the temporary list generated for search in S201, a subscription-applying prompt is sent to the user terminal that currently registers and the subscribed-for user selects whether to send a subscription request to the conformed registered users; if the registered users return allowing the subscription by the counterpart and subscribing for a counterpart, in the case that the user A transfers the address book, the address book server establishes a subscription relation for the user A and a registered user, updates the subscription relation lists of both the user A and the registered user, deletes corresponding contact information in the temporary list and updates contact information corresponding to the registered user in the user A. If the user A uses an address book application to log in for the first time, the address book server establishes a subscription relation for the user A and the registered user And updates the subscription relation lists of both the user A and the registered user; furthermore, when the user A has a storage, the address book server sends the user A the address book information of the registered users found in the search; when the user A does not have a storage, the address book server stores the address book information of the registered users found in the search in the storage area dedicated to the user A in the address book server.

S204: the contact information of other users in the temporary list which is not found in the search is saved in the unassociated storage area belonging to the user A in the address book server and users in the unassociated storage area are searched through every time when another new user registers.

The address book information of users in the unassociated storage area will be displayed in a way different from the way of showing the contact information which is subscribed for so that the user A may differentiate the contact information of users with subscription relations established from the contact information of users without subscription relations according to the displayed way. When a new user registers and all of the registered address book information or multiple items of the registered address book information is identical or conform to that of the unassociated information, an association prompt is sent to the user A and the user A chooses whether to subscribe for the new registered user and update an associated user to the registered new user.

Figure 3:
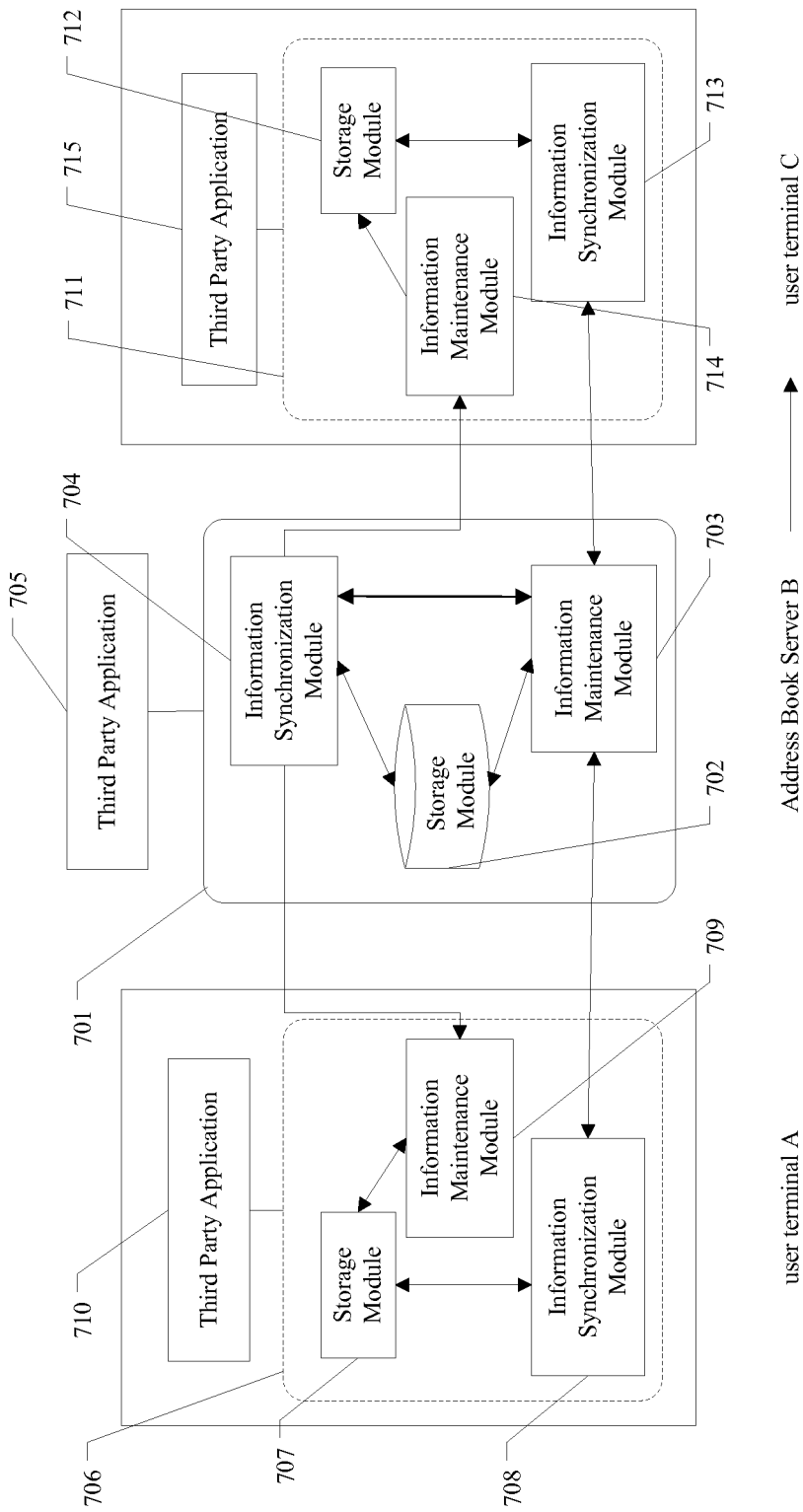
FIG. 3 is a schematic diagram illustrating the structure of a system for maintaining contact information in accordance with the present invention.

FIG. 3 shows an embodiment of the system and apparatus in accordance with the present invention. The system consists of user terminal A, user terminal C and Address Book Server B, wherein Address Book Application 706 and Address Book Application 711 are installed in user terminal A and user terminal C respectively and are working with Address Book Server B to maintain the address book information in this system. The details of the system are given as follows.

Address Book Server 701 is deployed on the Internet and consists of Storage 702, Information Maintenance Module 703 and Information Synchronization Module 704, wherein the Storage 702 is used for storing a relation list for the user and a subscriber device, address book information of users and authorization settings for the subscriber device; the Information Maintenance Module 703 is used for acquiring the address book information of users, authorization settings of the address book information and the modifications made by the users to the address book information of the users in the address book server; and the Information Synchronization Module 704 is used for receiving from the information maintenance module the address book information updated by users and updating the address book information of subscriber devices according to the subscription relations and authorizations in the relation list. Information Synchronization Modules 708 and 713 in the address book applications interact with the address book server when the user terminals log in or register at the address book server so as to send the address book information and authorization of the address book information to the address book server and further to enable the user terminals to modify the address book information of the user terminals, and the modification may include adding, deleting, logging out, etc. Information Maintenance Module 709 and Information Maintenance Module 714 in the address book applications are used for acquiring address book subscription requests from subscribers and returning the subscribed-for users' confirmation information of the subscription requests from subscriber devices to the address book server, the Information Maintenance Module 709 and the Information Maintenance Module 714 are also used for acquiring updated address book information of the subscribed-for user and updating address book information corresponding to the subscribed-for user in the storage. Storage 707 and Storage 712 are used for storing the address book information of other users subscribed for by the user terminals and the user terminals.

Furthermore, the address book application and the address book server may also provide user information for third party applications. The third party applications utilizing the address book may include two kinds of forms: one is Third Party Application 710 and Third Party Application 715 that are installed on the user terminals, the other is Application 705 deployed on the Internet. The third party applications installed on the user terminals may read local address book information directly or read the information on the address book server; the application deployed on the Internet utilizes the address book information in the address book server.

The subscription relation may include two kinds: a bi-directional relation and a unidirectional relation. If user A and user C have a bi-directional relation, then they have the contact method of each other on their local address books respectively; if the relation between the two users is unidirectional, e.g., user A considers user C as a friend while user C does not consider user A as a friend, then the local address book of user A contains the information of user C while the local address book of user C does not have the information of user A.

The system may be implemented on a PC operation system or a mobile terminal operation system WebOS, and the data relations in the address book information may be implemented by using a relational database or implemented by using a SOAP or other formatted XML as an information interaction protocol and based on a HTTP or TCP/IP transport protocol. The user terminals may include smart phones, tablet computers, personal computers, etc.

Figure 4:
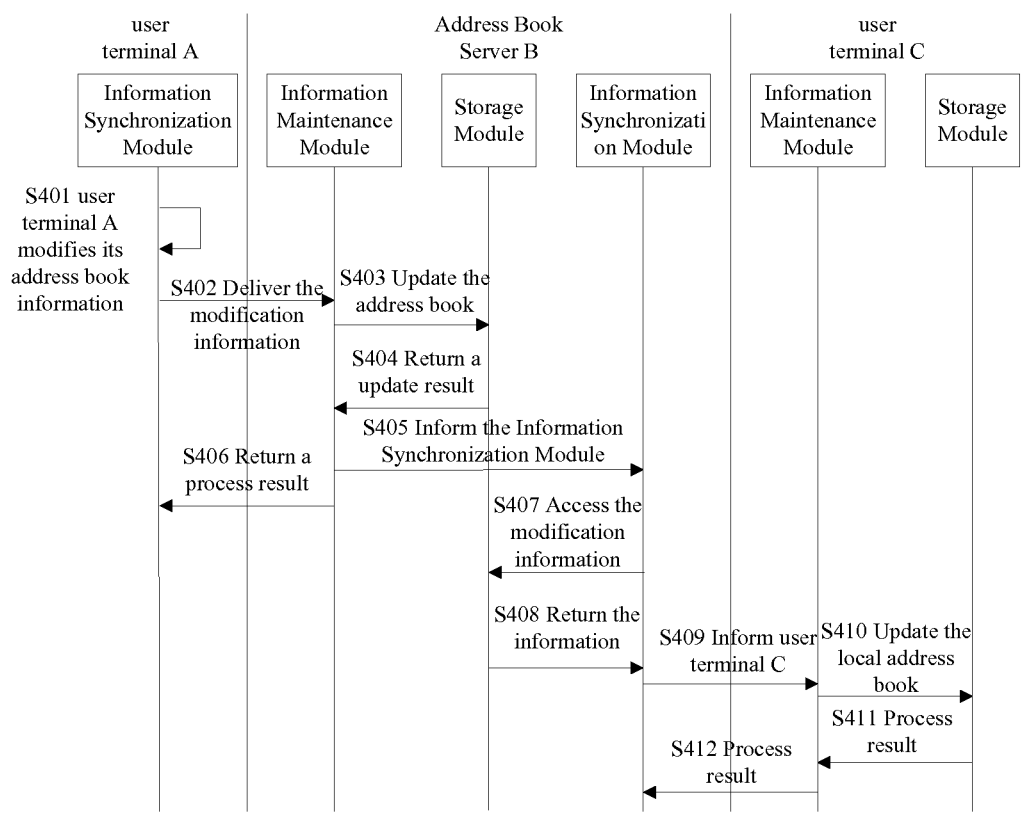
FIG. 4 is a flow chart illustrating the signaling of a method for updating address book information in accordance with the present invention.

FIG. 4 shows a method for users to modify and update address books in accordance with an embodiment of the present invention, which uses the system shown in FIG. 3, wherein user terminal A and user terminal C have a bi-directional subscription relation and each has a storage. The user terminal A has registered multiple sets of address books of the user terminal A and the user terminal A modifies its own address book information in the server. The method is described in detail as follows.

S401: the user terminal A modifies its own address book information, wherein the address book information is acquired by Address Book Application 706 from the address book server and the address book information may be information set by the user as public, protected or private. Specifically, the address book information may include name, telephone number, Email address, home address, identity card number, age, etc.

S402: Information Synchronization Module 708 in user terminal A sends the address book information modified to the address book server via one or multiple access networks among TCP/IP, WIFI, GPRS, GSM, etc., for Information Maintenance Module 703 in the address book server to process.

S403: upon receipt of the modification of the user's address book information made by the user, the Information Maintenance Module 703 in the address book server selects an operation type according to the type identifier ModifyType in the modification information sent from the user terminal A. When the ModifyType includes Address_add, the Information Maintenance Module 703 adds a set of address book information into the address book information of the user terminal A in Storage 702 in the address book server; when the ModifyType includes Address_delet, the Information Maintenance Module 703 deletes address book set or address book information item designated by the user terminal A from the Storage 702; when the ModifyType includes Address_Revise, Information Maintenance Module 703 replaces the address book information item corresponding to user A in the Storage 702 according to the modification information received; when the ModifyType includes Address_Logout, the Information Maintenance Module 703 acquires the identifier of the user A from the modification information received, searches for the address book set designated for logout in the storage according to the identifier of the user A and executes a log-out operation.

After completing the operation above successfully, the Information Maintenance Module 703 sets the first identifier User_Reflash identifier in the synchronization update list of the user terminal A in the address book server to 1, sets the Sub_Reflash identifier behind the subscriber devices in the third identifier Reflash_To identifier column to 1, finds a synchronization record lists corresponding to the subscriber devices and sets their User_Reflash identifier to 1 to indicate that the subscriber devices contain subscriber identifiers that need update, and sets the Sub_Reflash identifier of the subscriber devices in the second identifier Reflash_From identifier column to 1; setting the Sub_Reflash identifier to 0 indicates the completion of the update of the subscriber device, as shown in FIG. 5.

S404: the Storage 702 in the address book server completes an operation command from the information maintenance module and returns a result of the operation, Address_ModifyOK.

S405: if the address book information of user terminal A in the address book server is successfully updated, the Information Maintenance Module 703 sends the Information Synchronization Module 704 a request for updating the address book information of the subscriber devices of the user A.

S406: the address book server sends a response to the user terminal A to indicate that the server has processed the request for updating the information from the user.

S407: the Information Synchronization Module 704 in the address book server sends a request to the Storage 702 in the address book server for acquiring the address book information, relation list and synchronization update list of the user terminal A.

S408: upon receipt of the request for the address book information carrying the identifier of the user terminal A, the Storage 702 in the address book server reads the address book information, relation list and synchronization update list of user A and returns the read information to the Information Synchronization Module 704.

After Step S408, subscriber devices need to be informed of the address book modification information of the user terminal A. Specifically, the Information Synchronization Module 704 sends an address book update information according to the user identifiers corresponding to the Sub_Reflash whose value is set to 1 in the Reflash_To identifier column of the synchronization update list of the user A and according to the log-in status of the users corresponding to the user identifiers. In this embodiment, taking that the user terminal C is logged in for example, the process proceeds to Step S409.

S409: upon receipt of the identifier of the user terminal A, the Information Synchronization Module 704 in the address book server sends a synchronization update message to Information Maintenance Module 714 in the user terminal C, wherein the synchronization update message carries the updated address book information of the user terminal A.

The sending of the synchronization update request includes: searching, one by one, by the Information Synchronization Module 704 in the address book server according to the acquired synchronization update list of the user terminal A, for the users whose Sub_Reflash identifiers in the Reflash_To identifier column are set to 1, checking the authorization setting in the relation list of the user terminal A when the Sub_Reflash of the user terminal C is found to be 1, and sending the updated address book information that fits the authorization setting. If the user terminal C is a regular subscriber, the Information Synchronization Module 704 sends the user terminal C the address book information items that are modified by the user terminal A and are set as public; if the user terminal C is given the access to protected information by the user A, the Information Synchronization Module 704 sends the user terminal C the address book information items that are modified by the user terminal A and are set as public and protected.

S410: upon receipt of the synchronization update request, the Information Maintenance Module 714 of the user terminal C extracts the address book information of the user terminal A and forwards the extracted address book information to Storage 712 of user terminal C.

S411: The Storage 712 of the user terminal C returns a process result after updating the address book information of the user terminal A.

S412: The Information Maintenance Module 714 in the user terminal C returns the process result to the Information Synchronization Module 704 in the address book server; if the process result received by the Information Synchronization Module 704 indicates a success, the Sub_Reflash identifier corresponding to the user terminal C in the Reflash_To identifier column in the synchronization update list of the user terminal A is amended to 0 and the Sub_Reflash identifier corresponding to the user terminal A in the Reflash_From identifier column in the synchronization update list of the user terminal C is amended to 0. The next user terminal is updated in order and steps S409 to S412 are continued, until the last user ID in the synchronization update list of the user terminal A is processed and the process ends. Only when both the Reflash_To identifier column and the Reflash_From identifier column in the synchronization update list of the user terminal A or the user terminal C are set to zeros, the corresponding User_Reflash identifiers are set to zero to indicate that no address book information update is needed for the corresponding users.

In this embodiment, in the case of that the user terminal C does not log in the address book server before the user terminal A updates the address book information of the user terminal A in the Address Book Server B, specifically includes: the Information Synchronization Module 704 in the address book server searches, after completing Step S405, for the subscriber devices of the user terminal A that are logged into the address book server according to user IDs corresponding to the Sub_Reflash identifiers which are 1 in the synchronization update list of the user terminal A. If the user terminal C does not log in, the Information Synchronization Module 704 skips the user terminal C and continues to search other subscriber devices in the synchronization update list of the user terminal A until the searching is completed.

In this embodiment, in the case that the user terminal C logs in the address book server after the user terminal A completes the update, the Information Maintenance Module 703 in the address book server acquires the login information from the Information Synchronization Module 714 in the user terminal C and forwards the user ID of the user terminal C to the Information Synchronization Module 704 in the address book server to indicate that the user terminal C has logged in, then the Information Synchronization Module 704 acquires the synchronization update list of the user terminal C from the Storage 702 in the Address Book Server B. If the User_Reflash identifier in the synchronization update list is 1, it is indicated that the address book information of other users stored in the user terminal C needs to be updated or other users that subscribe for the address book information of the user terminal C need to be updated. In this embodiment, it is just considered that the address book information of other users stored in the user terminal C needs to be updated. If the Information Synchronization Module 704 finds that the Sub_Reflash identifier corresponding to the user terminal A is 1 in the Reflash_From identifier column in the synchronization update list of the user terminal C, the Information Synchronization Module 704 acquires the address book information and a relation list of user terminal A from the Storage 702 in the address book server, and acquires the updated address book information items in the user terminal A according to the authorization setting for the user terminal C in the relation list and proceed to Steps S409 to S412.

In this embodiment, apart from key word User_Reflash, the synchronization modification time Sync_Time may also be used to determine whether the update is completed and for example, a time format is: 2011-9-7. The storage of a subscriber device saves the Sync_Time of the subscribed-for user and the storage of the address book server saves the Sync_Time of the registered users. When the information of the subscribed-for user is modified in the address book server, the Sync_Time of the subscribed-for user saved in the storage of the address book server is updated as the latest modification time; every time when a subscriber device logs in the address book server, the address book server compares the Sync_Time of the subscribed-for user in the subscriber device with the Sync_Time of the subscribed-for user in the address book server according to the subscription relation list of the subscriber device, the address book information of corresponding subscribed-for user is updated in the subscriber device if a discrepancy is found, and the Sync_Time of the subscribed-for user is updated in the subscriber device to be identical to the Sync_Time of the subscribed-for user in the address book server.

In another method embodiment of the present invention, as shown in FIG. 6, Address Book Server B has an address book information storage and user terminal C does not have a storage and a address book information list of user terminal C is stored in the address book server in this embodiment. The address book information list shows the address book information of users in the form of a list. Specifically, the embodiment is implemented as follows.

S501: user terminal A modifies the address book information of the user terminal A which is acquired by Address Book Application 706 from the address book server, and the address book information may be information set as public, protected or private, in particular, including name, telephone number, Email address, home address, identity card number, age, etc.

S502: Information Synchronization Module 708 in the user terminal A sends the address book information modified by the user terminal A to the address book server via one or multiple access networks among TCP/IP, WIFI, GPRS, GSM, etc., for Information Maintenance Module 703 in the address book server to process.

S503: the Information Maintenance Module 703 in the address book server forwards the received address book modification information of user A to Information Synchronization Module 704.

S504: upon receipt of the modification of the user's address book information made by the user, the Information Synchronization Module 704 in the address book server selects an operation type according to the type identifier ModifyType in the modification information sent from the user terminal A. When the ModifyType is Address_add, the Information Synchronization Module 704 adds a set of associated address book information into the address book information of the user terminal A in the Storage 702; when the ModifyType is Address_delet, Information the Synchronization Module 704 deletes an address book set designated by the user terminal A from the Storage 702; when the ModifyType is Address_Revise, the Information Synchronization Module 704 replaces corresponding address book information item in the Storage 702 according to the modification information received; when the ModifyType is Address_Logout, the Information Synchronization Module 704 acquires a user identifier from the modification information received, searches for the address book set designated for the logout in the storage according to the user identifier and executes a log-out operation.

S505: the Information Synchronization Module 704 in the address book server modifies user information in the Storage 702 in the address book server according to a specific operation type, updates the address book information corresponding to the user A in the address book information lists of subscriber devices according to the subscription relation list of the user A, and returns a process result to the Information Synchronization Module 704.

S506: The Information Synchronization Module 704 in the address book server sends, to the Information Maintenance Module 703 in the address book server, the modification of the address book information of the user A in the address book server and the update results of the address book information regarding the user A in the address book of user A's subscriber, e.g., user C.

S507: the Information Maintenance Module 703 in the address book server returns a process result of the address book server, e.g., modification success, network malfunctioning, etc., to the information maintenance module of user terminal A.

Compared to the embodiment of the present invention with which a user terminal has a fixed address book information storage, this embodiment is better with the information security and the flexibility in the application of a cross-terminal platform, this embodiment also eliminates the information synchronization between the storage in the user terminal and the storage in the server.

In this embodiment, the address book information of the subscriber devices may be saved in the address book server, and when the subscriber devices log into the address book server, an address book information list consists of the address book information of the subscribed-for devices is generated temporarily and Step S505 is executed, that is, the Information Synchronization Module 704 in the address book server modifies user information in the Storage 702 according to the specific operation type and the Storage 702 returns the process result the to the Information Synchronization Module 704. This embodiment reduces the complicity of the synchronization update without requiring additional storage space in the address book server.

Figure 7:
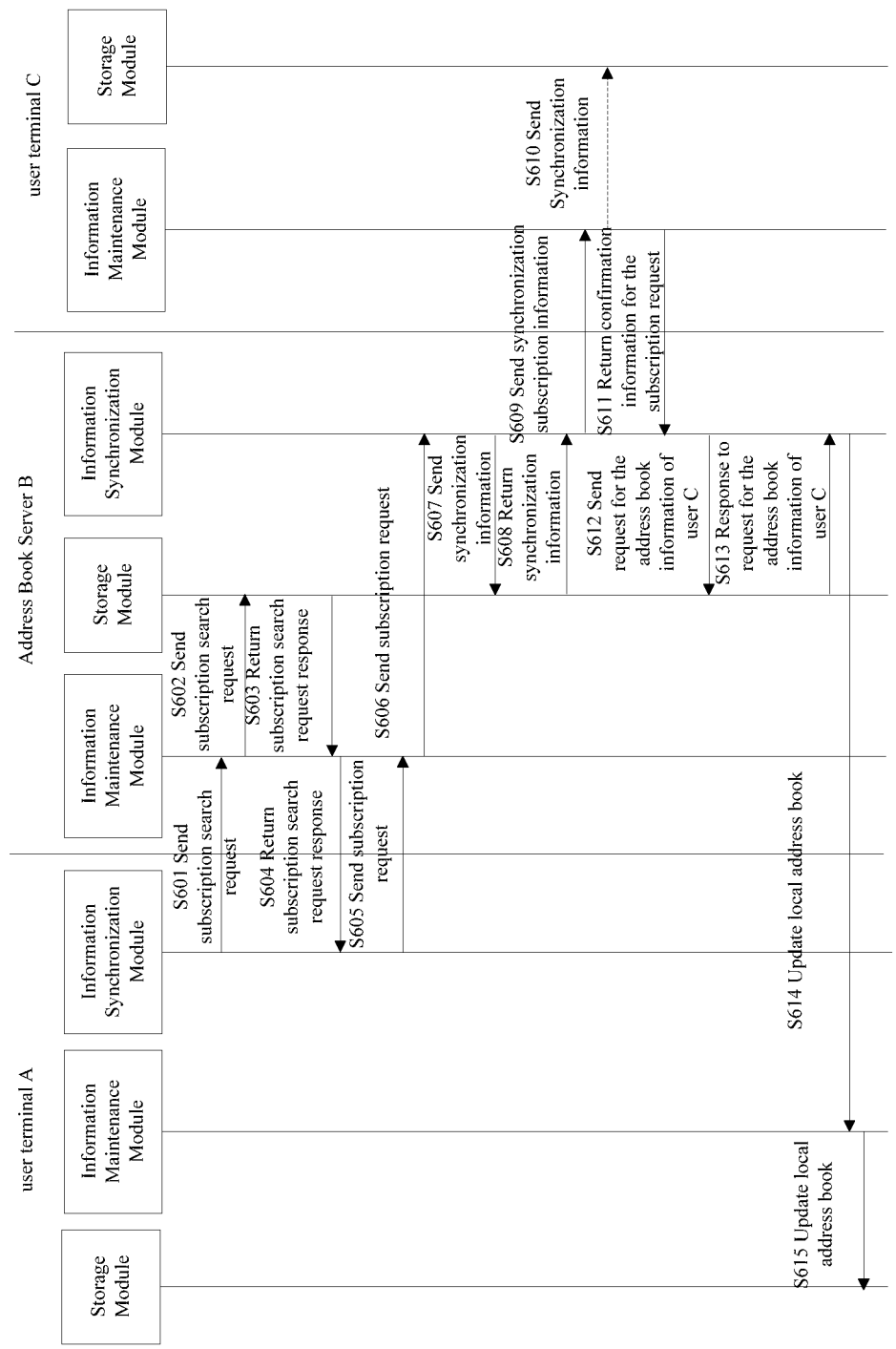
FIG. 7 is a flow chart illustrating the signaling for establishing a subscription relation for a user in accordance with the present invention.
Figure 8:
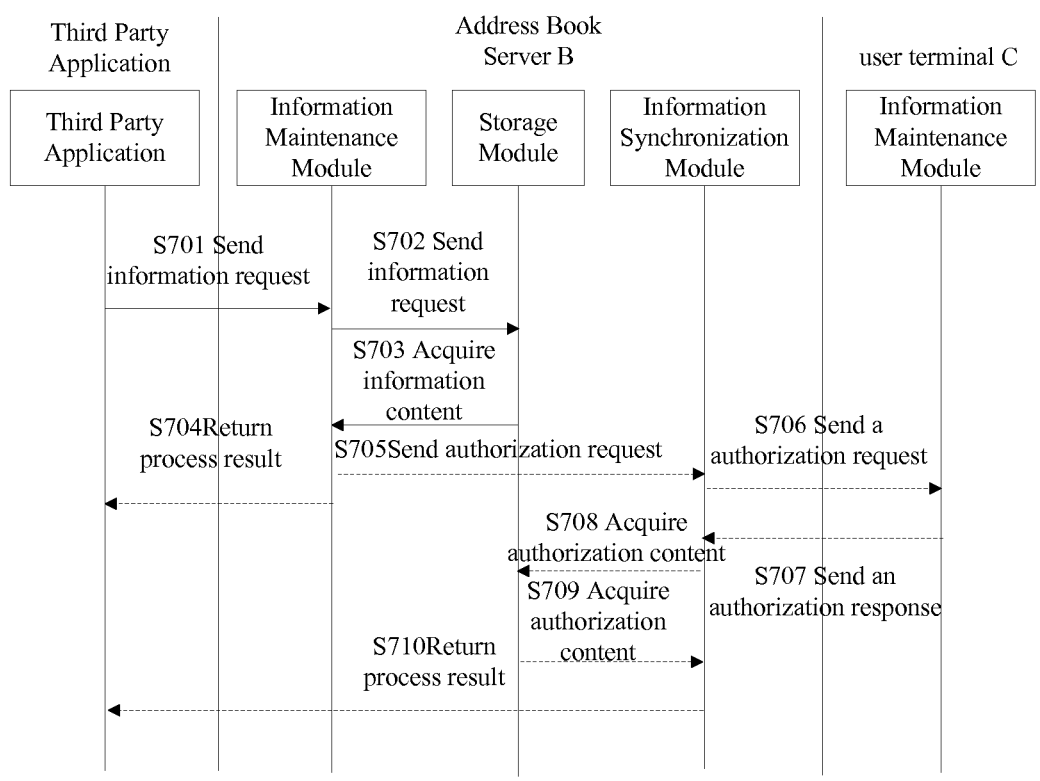
FIG. 8 is a flow chart illustrating the signaling used by a third party application based on an address book server in accordance with the present invention.

In an embodiment of establishing a subscription relation by a user in accordance with the present invention, as shown in FIG. 7, user terminal A establishes a subscription relation with user terminal C through Address Book Server B. In this embodiment, subscriber devices may be other user terminals, third party applications or third party services partnered with the address book server. Specifically, the embodiment is implemented as follows.

S601: the user terminal A sends a subscription search request carrying subscription information to Address Book Server B. The user terminal A inputs specific information items of the address book information of User C that the user terminal A intends to subscribe for into a subscription search box in an address book application, the information items may be any one or the combination of the information such as user name, ID, age, birthday, etc. The address book application may provide conventional key combination "and" and "or" beside the search box.

S602-S604: upon receipt of the subscription search request from the user terminal A, the Information Maintenance Module 703 in the address book server sends the subscription search request to Storage 702 on the server side. The Storage 702 returns an address book information subscription search list to the Information Maintenance Module 703 according to a criteria in the subscription search request, the search list is selected from public information of subscribed-for users and may include: one or multiple items among user name, gender, age and address, and the subscribed-for users include registered users stored in the address book server who meet the subscription search request. The Information Maintenance Module 703 sends a subscription search request response to Information Synchronization Module 708 in user terminal A.

In processes S601 to S604, the subscription request may also be sent after the user inputs complete subscription search information; in processes S601 to S604, processes S601 to S604 may be executed immediately when any subscription search information is inputted in the subscription box in the user terminal A and the execution result may be shown in the address book application of the user terminal A in the form of subscription search result list of dynamic variable address book information.

S605: the user terminal A confirms the contents of the subscription search request response returned in S604, and the Information Synchronization Module 708 in the user terminal A returns the conformed subscription information to the Address Book Server B.

S606-S608: upon receipt of the confirmation message from the user terminal A, the Information Maintenance Module 703 in the address book server forwards the confirmation message to the Information Synchronization Module 704 in the address book server, the Information Synchronization Module 704 then sends synchronization information carrying the user ID of user terminal A to the Storage 702 in the address book server to acquire the address book information of the user terminal A.

S609: the Information Synchronization Module 704 of the Address Book generates confirmation information for the subscription request and sends the confirmation information for the subscription request to Information Maintenance Module 714 in the user terminal C. To be specific, the address book server sets User_Subs in a synchronization subscription list of the user terminal C to 1, adds the user ID of the user terminal A into the Subs_From identifier column and sets the identifier corresponding to the user ID of the user terminal A to 1, sets the User_Subs in the synchronization subscription list of the user terminal A to 1, adds the user ID of the user terminal C into the Subs_To identifier column and sets the identifier corresponding to the user ID of the user terminal C to 1. The Information Synchronization Module 704 in the address book server will read the subscription request of user terminal A from the Sub_From in the synchronization subscription list of the user terminal C in the Storage 702 of the address book server when the user terminal C logs in, and the synchronization subscription list is shown in FIG. 9. When the identifier corresponding to the user IDs of both users in the Sub_From column and the Sub_To column of the user terminals are set to 0, the User_Subs is set to 0.

S610: The Information Maintenance Module 714 of the user terminal C receives synchronization subscription information containing the address book information of the user terminal A from the Address Book Server B, and shows options to the user terminal C, the options including: allowing the subscription by the counterpart and subscribing for a counterpart, allowing the subscription by the counterpart, or forbidding the subscription by the counterpart.

When the user terminal C chooses to allow the subscription by the counterpart, the information maintenance module of the user terminal C sends confirmation information for the subscription request to the Information Synchronization Module 704 of the address book server and proceeds to Step S611; when the user terminal C chooses allowing the subscription by the counterpart and subscribing for the counterpart, the user terminal C further stores the address book information of the user terminal A into the Storage 712 of the user terminal C and continues to execute Step S611.

S611-S612: the information maintenance module of the user terminal C returns confirmation information for the subscription request to the Information Synchronization Module 704 of the address book server, the Information Synchronization Module 704 of the address book server updates the relation lists of the user terminal A and the user terminal C in the Storage 702 respectively; when the user terminal C chooses to allow the subscription by the counterpart, a unidirectional subscription relation is established for the user terminal A to subscribe for the user terminal C; when the user terminal C chooses allowing the subscription by the counterpart and subscribing for the counterpart, a bi-directional subscription relation is established between the user terminal A and the user terminal C and the Information Synchronization Module 704 of the address book server sends a request to the Storage 702 for the address book information of the user terminal C.

S613-S615: The Storage 702 of the address book server receives the request for the address book information from the Information Synchronization Module 704, and returns a response to the request for the address book information. The Information Synchronization Module 704 sends updated address book information to Information Maintenance Module 709 of user terminal A and the Information Maintenance Module 709 saves the address book information of the user terminal C in the Storage 707 of the user terminal A.

When the user terminal C chooses to forbid the subscription by the counterpart, the information maintenance module of the user terminal C sends a synchronization response to the Information Synchronization Module 704 of the address book server; then the Step S611 is executed, Steps S612 and S613 are skipped and the proceed to Step S614 to directly send a response message indicating that the counterpart refuses the subscription to the information maintenance module of the user terminal A and the process ends.

In this embodiment, when one or both of the user terminal A and the user terminal C do not have a storage, the operation of the storage of the corresponding user terminal may be implemented by the storage of the address book server to store information in FIG. 3.

In this embodiment, the subscription function may be achieved by adding a new synchronization subscription list or by using an existing synchronization update list along with an address book application in the user terminal. For example, when a user terminal subscribe for the user C, if the address book server receives a subscription request from the user A for the user C, then the address book server sets User_Reflash in the synchronization update lists of the user A and the user C to 1, sets the Reflash_To in the synchronization update list of the user A to 1 and sets the Reflash_From in the synchronization update list of the user C to 1. When Information Synchronization Module 704 of the address book server sends the address book information of user A to the address book application of the user C through the synchronization update list, if the address book application finds out no address book information of the user A is stored in the address book application, the address book application activates the subscription function and shows the subscription request from the user A to the user C and returns a subscription response carrying a subscription identifier to the address book server.

In this embodiment, after the subscription relation is established between the user A and the user C, the user A may further group users and assign additional authorization, e.g., the users in the group may view information with protected authorization.

In an embodiment of the present invention in which a third party application acquires address book information, the third party application may be also shopping websites, online bulletins, applications, etc., that partner with the address book server of the present invention. In this embodiment, taking an online shopping of a user for example, when the receiver of online shopping is user terminal C, the embodiment is implemented as follows.

S701: after the user completes shopping and enters a payment interface, the user needs to fill in shipping address information, and when the user enters the name of shipment recipient into a user name box on a shopping page, the Third Party application 705 sends an information request to Address Book Server B and the information request carries related information including address, contact method, etc., which are necessary for delivering.

S702-S703: according to the authorization set by the user terminal C in the Address Book Server B during registration, e.g., allowing the third party application to acquire public address book information or allowing the third party application to acquire public and protected address book information, the third party application acquires address book information; if the information acquired by the third party application meets all the requirements in the information request, proceed to Step S704 and complete the process of acquiring the address book information for the online shopping; if the information acquired does not include all the essential information required by the information request and the address book information set as protected by the user terminal C is further needed, proceed to Step S705 to confirm the corresponding protected address book information.

S705: Information Maintenance Module 703 in the address book server sends authorization request information corresponding to address book information items to the Information Synchronization Module 704 in the address book server and the Information Synchronization Module 704 shall realize it. To be specific, when the user terminal C is in a log-in state, Information Maintenance Module 714 receives the authorization request information in a form such as "user A is requesting authorization on XXX from you through XXX website" so that the user terminal C decides whether to allow the third party application to acquire the address book information in the Address Book Server B; when the user terminal is in a log-out state, the information synchronization module may send an authorization confirmation request to the mobile phone of the user C in the form of short message service and return an authorization response to the Information Synchronization Module 704 according to short message confirmation information from the user.

S708-S709: if the response acquired is allowance, the Information Synchronization Module 704 of the address book server executes Step S709, that is, acquires the protected address book information of the user terminal C needed by the third party application from Storage 702 of the address book server; if the response acquired is not allowance, the Information Synchronization Module 704 does not execute Step S709, and proceeds directly to subsequent Step S710.

S710: the information synchronization module returns a response to the third party application, wherein the response carries either the needed protected address book information of the user terminal C or a refusal to provide the information by the user.

In an embodiment of a method for displaying high frequent contacts of the user according to the present invention, as shown in FIG. 10, the user terminal may be a smart phone, PDA, tablet computer or PC and different terminals may be used to log in in the practical application.

The address book server records a list of frequencies that the user contacts each user in the address book within a time period and the last communication time, when the user logs in the address book server, the address book server acquires the last communication time recorded in the terminal used by the current user and compares the two last communication times. If the last communication time recorded in the address book server is newer, a list of frequencies of the current user is updated; if the last communication time recorded by the current user is newer, the list of frequencies in the address book server is updated. In this embodiment, latest updated contact may also be added, to be specific, the address book application records the subscribed-for users who updated their address books latest, e.g., when the number of latest updated contacts is set to be 10, every time a subscriber logs in the address book server, the subscriber acquires the information of the subscribed-for users who are currently updated, and records the information in a latest updated contact list; every time the information of a latest updated subscribed-for user is acquired, the subscribed-for user is listed at the top of the latest updated contact list, the existing subscribed-for users in the latest updated contact list will be pushed down by one place and the subscribed-for users beyond the 10th place will be deleted. This makes it more convenient for the user to notice the latest updates with the contacts of the user.

The present invention provides a complete method for maintaining contact information, wherein an address book application is provided for user terminals and cooperates with the address book server to achieve automatic update of the address book information in user terminals, authorization mechanism and protocol interface for third party applications may be added to further expand the functionalities of address books.

The principle and embodiments of the present invention is described above with examples in the present invention. The above embodiments are used to facilitate the understanding of the method and idea of the present invention. Moreover, those skilled in the art may further modify the embodiments and application scope according to the idea provided by the present invention, and hence the description above should not be taken as a limit to the present invention.

What is claimed is:

1. A method for maintaining contact information, comprising:
   acquiring address book information of a user and authorization settings of the address book information of the user and saving the address book information in an address book server;
   receiving a subscription request from a subscriber device, and establishing, according to confirmation information from a subscribed-for user regarding the subscription request from the subscriber device, a subscription relation list for the subscribed-for user and the subscriber device; and
   updating, by the address book server, address book information of the subscriber device according to a subscription relation and authorization settings in the subscription relation list when the subscribed-for user modifies address book information of the subscribed-for user stored in the address book server.

2. The method according to claim 1, wherein the updating, by the address book server, address book information of the subscriber device according to a subscription relation and authorization settings in the subscription relation list, further comprises:
   updating, by the address book server, synchronization update lists for the subscribed-for user and the subscriber device according to the subscription relation in the subscription relation list, respectively, wherein the synchronization update lists are stored in the address book server; searching for, by the address book server, a subscriber device to be updated according to the synchronization update lists and sending an address book information item update message.

3. The method according to claim 2, wherein the updating, by the address book server, synchronization update lists for the subscribed-for user and the subscriber device according to the subscription relation in the subscription relation list, respectively, further comprises:

saving a synchronization modification time of the subscribed-for user in a storage of the subscriber device, and saving a synchronization modification time of a registered user in a storage of the address book server; updating the synchronization modification time of the subscribed-for user saved in the storage of the address book server to a last modification time when information of the subscribed-for user is modified in the address book server; comparing, by the address book server, the synchronization modification time of the subscribed-for user in the subscriber device with the synchronization modification time of the subscribed-for user in the address book server according to the subscription relation list for the subscriber device when the subscriber device logs in the address book server, updating address book information of corresponding subscribed-for user stored in the subscriber device if a discrepancy is found, and updating the synchronization modification time of the subscribed-for user stored in the subscriber device to be identical with the synchronization modification time of the corresponding subscribed-for user in the address book server.

4. The method according to claim 1, further comprising: registering, by the user, the address book information of the user in the address book server, and setting respective authorization for address book information items, wherein the registered address book information of the user is in one set or multiple sets, and a set of address book information which is activated and used is chosen by the user.

5. The method according to claim 4, further comprising: switching, by the address book server, between different sets of user address book information according to address information of a terminal through which the user logs in and address items in the address book information registered by the user in the case that multiple sets of address book information are registered by the user.

6. The method according to claim 1, further comprising: uploading, by an address book application of a user terminal, contact information of other users stored before the user logs in the address book server for the first time; searching, by the address book server, the address book information of registered users in a storage, and sending a subscription-applying prompt to the user terminal which currently uploads the contact information when contact information or multiple items of information are found identical or conform to the uploaded contact information of other users; and choosing, by the user terminal, whether to send a subscription request to the conformed registered users.

7. The method according to claim 6, further comprising: searching, when a new user registers, the contact information of the other users which is uploaded without subscription relations established; sending a subscription-applying prompt to the user terminal which uploads the contact information when contact information of the other users or multiple items of information are found identical or conform to the address book information registered by the new user; and choosing, by the user terminal, whether to send a subscription request to the conformed registered new user.

8. The method according to claim 1, wherein the receiving a subscription request from a subscriber device, and establishing, according to confirmation information from the subscribed-for user regarding the subscription request from the subscriber device, a subscription relation list for a subscribed-for user and the subscriber device, further comprises:

returning, by the subscribed-for user, upon receipt of the subscription request, confirmation information for the subscription request to allow the subscription by a counterpart and subscribe for the counterpart, allow the subscription by the counterpart, or forbid the subscription by the counterpart; establishing, by the address book server, the subscription relation list for the subscribed-for user and the subscriber device when both the subscriber device and the subscribed-for user have a storage and the subscribed-for user chooses to allow the subscription by the counterpart, and sending a public address book information of the subscribed-for user to the subscriber device; storing, by the subscribed-for user, address book information set by the subscriber as public when the subscribed-for user chooses to allow the subscription by the counterpart and subscribe for the counterpart, establishing, by the address book server, the subscription relation list for the subscribed-for user and the subscriber device, and sending address book information set by the subscribed-for user as public to the subscriber device; and returning, by the address book server, a response message indicates that the subscription is refused by the counterpart to the subscriber device when the subscribed-for user chooses to forbid the subscription by the counterpart.

9. The method according to claim 1, wherein the receiving a subscription request from a subscriber device, and establishing, according to confirmation information from the subscribed-for user regarding the subscription request from the subscriber device, a subscription relation list for a subscribed-for user and the subscriber device, further comprises:

establishing, by the address book server, the subscription relation list for the subscribed-for user and the subscriber device when the subscriber device or the subscribed-for user has no storage and the subscribed-for user chooses to allow the subscription by a counterpart and subscribe for the subscriber, setting, by the address book server, an address book storage area for the subscriber device or the subscribed-for user which has no storage, saving public information in the storage area for the other, and sending confirmation information to the subscriber device.

10. The method according to claim 1, further comprising: establishing, by the address book server, address book information of unassociated users according to known information when the subscriber device fails to find the address book information of the subscribed-for user in the address book server, and displaying the address book information of unassociated users in a way different from that of the address book information of the subscriber; sending, by the address book server, a subscription prompt to the subscriber device when a new user registers address book information and the address book information registered or multiple items of information is identical or conformed to that of unassociated users, so that the subscriber device chooses whether to send a subscription request to the registered new user.

11. The method of claim 1, wherein the subscriber device, further comprises:
an address book application installed in a user terminal, or a third party application in the user terminal, or a third party application server independent of the user terminal.

12. A method for maintaining contact information, comprising:
sending, by an address book application in a user terminal, address book information and authorization settings of the address book information to an address book server;
acquiring an address book subscription request from a subscriber device forwarded by an address book server, returning confirmation information from a subscribed-for user to the address book server regarding the subscription request from the subscriber device;
modifying, by the address book application in the user terminal, the address book information of the user terminal in the address book server, wherein the modifying comprises modifying contents of address book information items or authorization of each of the address book information items; and
receiving, by the subscriber device, address book update information of the subscribed-for user sent from the address book server and updating address book information of the subscribed-for user in the subscriber device.

13. The method according to claim 12, further comprising:
choosing, by a user, a set of address book information which is activated and used when the address book information of the user is in one set or multiple sets.

14. The method according to claim 12, further comprising:
scanning, by the address book application, contact information of other users stored in the user terminal when the user terminal uses the address book terminal for the first time, uploading the contact information to the address book server and displaying the contact information in a way different from that of the address book information of subscribers until the user performs a deletion or the address book server creates a subscription relation list for the contact information of other users.

15. The method according to claim 12, further comprising:
receiving, by the address book server, a recommendation operation request when a user selects a subscribed-for user in the user's own subscription relation list and recommends the subscribed-for user selected to another subscribed-for user in the subscription relation list, and sending a subscription request from the another subscribed-for user to the selected subscribed-for user.

16. An address book server apparatus, comprising:
an information maintenance module, used for acquiring address book information of a user and authorization settings of the address book information and acquiring the modification made by the user on the address book information of the user stored in the address book server;
a storage, used for storing a relation list for the user and subscriber devices, address book information of the user and the authorization settings regarding the subscriber devices; and
an information synchronization module, used for receiving the address book information updated by the user from the information maintenance module and updating the address book information of the subscriber devices according to subscription relations and authorization settings in the relation list.

17. The apparatus according to claim 16, wherein
the information maintenance module further updates the synchronization update lists of the subscribed-for user and the subscriber device respectively according to the subscription relation in the subscription relation list, wherein the synchronization update lists are stored in the address book server; the information synchronization module searches for a subscriber device to be updated according to the synchronization update lists and sending an address book information item update message.

18. An address book application apparatus, comprising:
an information maintenance module, used for acquiring an address book subscription request of a subscriber and returning confirmation information from a subscribed-for user regarding a subscription request of a subscriber device to an address book server, and further used for acquiring address book update information of the subscribed-for user and updating address book information corresponding to the subscribed-for user in a storage;
an information synchronization module, used for sending address book information and authorization on the address book information to an address book server and modifying the address book information of the address book application apparatus in the address book server; and
wherein the storage is used for storing the address book information of the subscribed-for user.

19. A system for maintaining contact information, comprising:
an address book server, used for receiving user address book registration information, which carries authorization settings of address book information, saving the user address book registration information in the address book server, receiving a subscription request from a subscriber device, establishing, according to confirmation information from a subscribed-for user regarding the subscription request from the subscriber device, a subscription relation list for the subscribed-for user and subscriber device, and updating, by the address book server, the address book information of the subscriber device according to subscription relation and authorization settings in the subscription relation list when the subscribed-for user modifies the address book information of the subscribed-for user stored in the address book server;
a user terminal, used for registering address book information of the user terminal at the address book server, modifies information of the user terminal in the address book server according to the operation of the user terminal, receiving, when the user terminal has a storage, updated address book information from the address book server after the subscribed-for user modifies the address book information of the subscribed-for user, and modifying the address book information of a subscription user stored in the user terminal.

20. The system according to claim 19, wherein
the user terminal is further used for selecting a subscriber of the user terminal in the address book server and recommending the subscriber to another subscriber of the user terminal, and the address book server is further used for receiving a recommendation operation request and sending a subscription request from another subscriber to a selected subscriber.

21. The system according to claim 19, wherein the system is implemented on one of a PC operation system or a mobile terminal operation system, WebOS, and the data relations in the address book information is implemented by using one of a relational database or implemented by using a SOAP or other formatted XML as an information interaction protocol and based on a HTTP or TCP/IP transport protocol.

* * * * *